(12) United States Patent
Vuilliomenet et al.

(10) Patent No.: US 7,520,242 B2
(45) Date of Patent: Apr. 21, 2009

(54) MICROMOTOR ARRANGEMENT FOR DRIVING A POINTER-TYPE INDICATING DEVICE

(75) Inventors: Marc Vuilliomenet, Hauterive (CH); Albert Pages, Fontainemelon (CH); Gérard Jacob, Saint-Blaise (CH); Andreas Hirt, Orpund (CH)

(73) Assignee: Microcomponents SA, Grechen (CH)

( * ) Notice: Subject to any disclaimer, the term of this patent is extended or adjusted under 35 U.S.C. 154(b) by 131 days.

(21) Appl. No.: 10/595,222

(22) PCT Filed: Sep. 1, 2004

(86) PCT No.: PCT/EP2004/009727

§ 371 (c)(1),
(2), (4) Date: Nov. 3, 2006

(87) PCT Pub. No.: WO2005/031271

PCT Pub. Date: Apr. 7, 2005

(65) Prior Publication Data

US 2007/0039541 A1     Feb. 22, 2007

(30) Foreign Application Priority Data

Sep. 26, 2003   (EP)   .................................. 03021844

(51) Int. Cl.
*G01D 11/24*   (2006.01)
*G01D 11/28*   (2006.01)
(52) U.S. Cl. .......................... 116/288; 116/284; 362/29

(58) Field of Classification Search ................. 116/284, 116/286, 287, 288, 300, 301, 305, 62.1, 62.4, 116/DIG. 5, DIG. 6, DIG. 36; 362/23, 28, 362/29, 30

See application file for complete search history.

(56) References Cited

U.S. PATENT DOCUMENTS

| 4,954,807 | A | | 9/1990 | Fleischer et al. |
| 5,080,035 | A | | 1/1992 | MacManus |
| 5,603,283 | A | | 2/1997 | Owen |
| 5,706,757 | A | * | 1/1998 | Hashimoto et al. .......... 116/288 |

(Continued)

FOREIGN PATENT DOCUMENTS

DE        195 38 547 A1     4/1997

(Continued)

OTHER PUBLICATIONS

International Search Report issued in corresponding application No. PCT/EP2004/009727, completed Mar. 10, 2005 and mailed Mar. 16, 2005.

(Continued)

*Primary Examiner*—R. A. Smith
(74) *Attorney, Agent, or Firm*—Griffin & Szipi, P.C.

(57) ABSTRACT

The present invention concerns a micromotor for an indicator device comprising a hand of the type generally used in the instrument panels of motor vehicles. More specifically, the present invention concerns a micromotor of this type comprising a case wherein the thickness of one area is smaller than its maximum thickness, so as to form a free space or recess open on the exterior, in particular on the bottom of the case. This recess can be advantageously used for arranging components necessary for the operation of the instrument panel in which the micromotor is mounted, thereby saving space with respect to devices of the prior art.

13 Claims, 4 Drawing Sheets

U.S. PATENT DOCUMENTS

| | | | |
|---|---|---|---|
| 6,302,552 B1 * | 10/2001 | Ross et al. | 362/30 |
| 6,408,784 B1 * | 6/2002 | Ross | 116/288 |
| 6,557,485 B1 * | 5/2003 | Sauter | 116/284 |
| 6,598,988 B1 * | 7/2003 | Noll et al. | 362/26 |
| 6,981,464 B2 * | 1/2006 | Birman et al. | 116/288 |
| 6,994,053 B2 * | 2/2006 | Abe et al. | 116/284 |
| 2004/0012273 A1 * | 1/2004 | Suzuki et al. | 310/67 R |
| 2004/0089219 A1 * | 5/2004 | Burau et al. | 116/288 |

FOREIGN PATENT DOCUMENTS

| | | |
|---|---|---|
| DE | 199 38 336 A1 | 3/2001 |
| EP | 536485 A2 * | 4/1993 |
| EP | 1 077 363 A2 | 2/2001 |
| EP | 1217335 A2 * | 6/2002 |
| EP | 1510791 A1 * | 3/2005 |
| EP | 1519159 A1 * | 3/2005 |
| JP | 09236458 A * | 9/1997 |
| JP | 10281820 A * | 10/1998 |
| JP | 2002340631 A * | 11/2002 |
| WO | WO 2005022088 A1 * | 3/2005 |
| WO | WO 2007138437 A2 * | 12/2007 |

OTHER PUBLICATIONS

PCT/IPEA/409 International Preliminary Report on Patentability in corresponding application No. PCT/EP2004/009727.

* cited by examiner

MICROMOTOR ARRANGEMENT FOR DRIVING A POINTER-TYPE INDICATING DEVICE

This is a National Phase Application in the U.S. of International Patent Application No. PCT/EP2004/009727 filed Sep. 1, 2004, which claims priority on European Patent Application No. 03021844.0, filed Sep. 26, 2003. The entire disclosures of the above patent applications are hereby incorporated by reference.

FIELD OF THE INVENTION

The present invention concerns a micromotor for a hand indicator device comprising a case inside which there are housed motor means and means provided for transmitting the movement from the motor means to a drive shaft with an axis X1 capable of driving a hand indicator. Further, the case comprises a first face, including an aperture making the drive shaft accessible and a second face opposite the first face, the distance separating the first face from the second face defining a maximum thickness E1 of the case.

The present invention also concerns an indictor device for an instrument panel comprising a micromotor, of the type defined hereinbefore, arranged on a printed circuit board, a hand indicator being mounted in the drive shaft of said micromotor.

A common example application of this type of indicator hand device is the indication of variations in a measured variable on the instrument panel of a motor vehicle, such as the speed of movement of the vehicle, the vehicle engine speed, the fuel level or the engine temperature.

It will be noted that, in this text, the term "motor" is used to designate the assembly that conventionally includes, by way of example, a rotor housed in a stator and rotor excitation coils, whereas the term "micromotor" designates this type of "motor" when it is integrated in a closed case and associated with means for driving a hand indicator.

BACKGROUND TO THE INVENTION

Devices of this type are known from the prior art. U.S. Pat. No. 4,954,807 discloses an example embodiment of an instrument panel for a motor vehicle wherein the respective values of various measured physical variables are indicated. One of the known concerns in this field is tackled in this American Patent, namely the space requirement of the devices used, in particular for achieving the simultaneous display of the respective values of a plurality of measured physical variables. Indeed, these devices have a non-negligible minimum space requirement if a certain degree of legibility is to be maintained for the information displayed.

Thus, the aforecited American Patent proposes an instrument panel structure that limits the space requirement of its constituent elements.

However, technical progress made in the motor vehicle industry over the last few years has pushed designers to further enrich the information displayed on the instrument panel.

Consequently, the number of constituent elements of the display devices also increases, in particular when the display of the measured physical variables is achieved in an analogue manner. In this case, electric motors have to be used, one motor generally having to be provided for each physical variable that has to be displayed. Further, an increasing number of electronic components are integrated in these instrument panels to carry out various calculations or to fulfil various display functions. The electric motors and the electronic components are typically mounted on a printed circuit board, whereas the electric motors are surmounted by a dial bearing indications or scales relating to the measured physical variables.

In order to achieve a reasonable overall space requirement for an instrument panel of this type, the designer is forced to find a compromise between the amount of information displayed on the one hand, and, on the other hand, the dimensions of the printed circuit board (PCB) carrying the constituent elements of the instrument panel, and the distance from the PCB to the dial mounted on the electric motors.

SUMMARY OF THE INVENTION

It is an object of the present invention to overcome the aforementioned drawbacks of the prior art by proposing a more compact micromotor structure compared to known micromotors of the prior art. A more compact micromotor allows construction of a more compact hand indicator device and therefore a more compact instrument panel comprising such hand indicator devices or displaying more information than with an instrument panel of the prior art of equivalent size.

The present invention therefore concerns a micromotor of the type indicated hereinbefore, characterized in that the case has a smaller area of thickness E2 than the maximum thickness E1 so as to define an open recess in the second face.

Owing to this structure, the free space outside the case by the recess can be used for arranging the constituent elements of the instrument panel, such as the electronic components for example.

Thus, in the particular non-limiting case according to which the case is fixed to a PCB by the second face, typically via its bottom, there is a free space arranged between a part of the bottom and the PCB. A plurality of electronic components can be arranged in this free space, whereas with the structures of the prior art these components could only be arranged beside the case on the PCB, which consequently increased the requirement for space.

In a particular embodiment of the present invention, a hollow type of drive shaft is used, the bottom of the case comprising an aperture arranged facing the hollow of the shaft. The hollow drive shaft is then associated with a hand indicator whose stem is transparent to enable propagation of the light rays that illuminate its index. Thus, owing to the particular structure of the present invention, it is possible to arrange a light source directly on the PCB facing the aperture arranged in the bottom of the case in order to illuminate the hand indicator. Thus, the light source can be mounted on the PCB during the manufacturing step in which the various electronic components are mounted on the PCB. One could for example use a light emitting diode (LED) type of light source compatible with surface mounting device (SMD) components, commonly used in instrument panels.

Moreover, if the micromotor is secured to the PCB via its first face, typically its cover, a support for the light source can be secured to the case on the part of the bottom in the recess. Of course, the support is then arranged such that when a light source is arranged therein, the light emitted propagates in the direction of the drive shaft hollow, i.e. towards the stem of the hand indicator.

If the case is made by plastic moulding, the light source support can be moulded in one piece with the case or, alternatively, securing means can be provided for arranging an added support that may be removable.

It is an additional object of the present invention to propose a hand indicator device structure allowing the same hand to be disassembled and remounted on the motor several times without being damaged.

For this purpose, the indicator device according to the present invention further includes, in a preferred manner, mechanical means for allowing said hand to be disassembled from said shaft a plurality of times. In particular, the hand can be disassembled a plurality of times without the drive shaft or the hand undergoing damage making them unsuitable for use.

More specifically, any deformations that occur when the hand stem is placed inside the hollow shaft take effect whereas the various elements involved remain within their respective ranges of resilient deformation.

BRIEF DESCRIPTION OF THE DRAWINGS

Other features and advantages of the present invention will appear more clearly upon reading the following detailed description, made with reference to the annexed drawings, given by way of non-limiting example and in which:

FIG. 2b shows an elevation view of one detail of the indicator device shown in FIG. 1;

FIG. 2c shows a schematic cross-section of an alternative embodiment of the indicator device shown in FIG. 2a;

DETAILED DESCRIPTION OF AN EMBODIMENT

Figure 1:
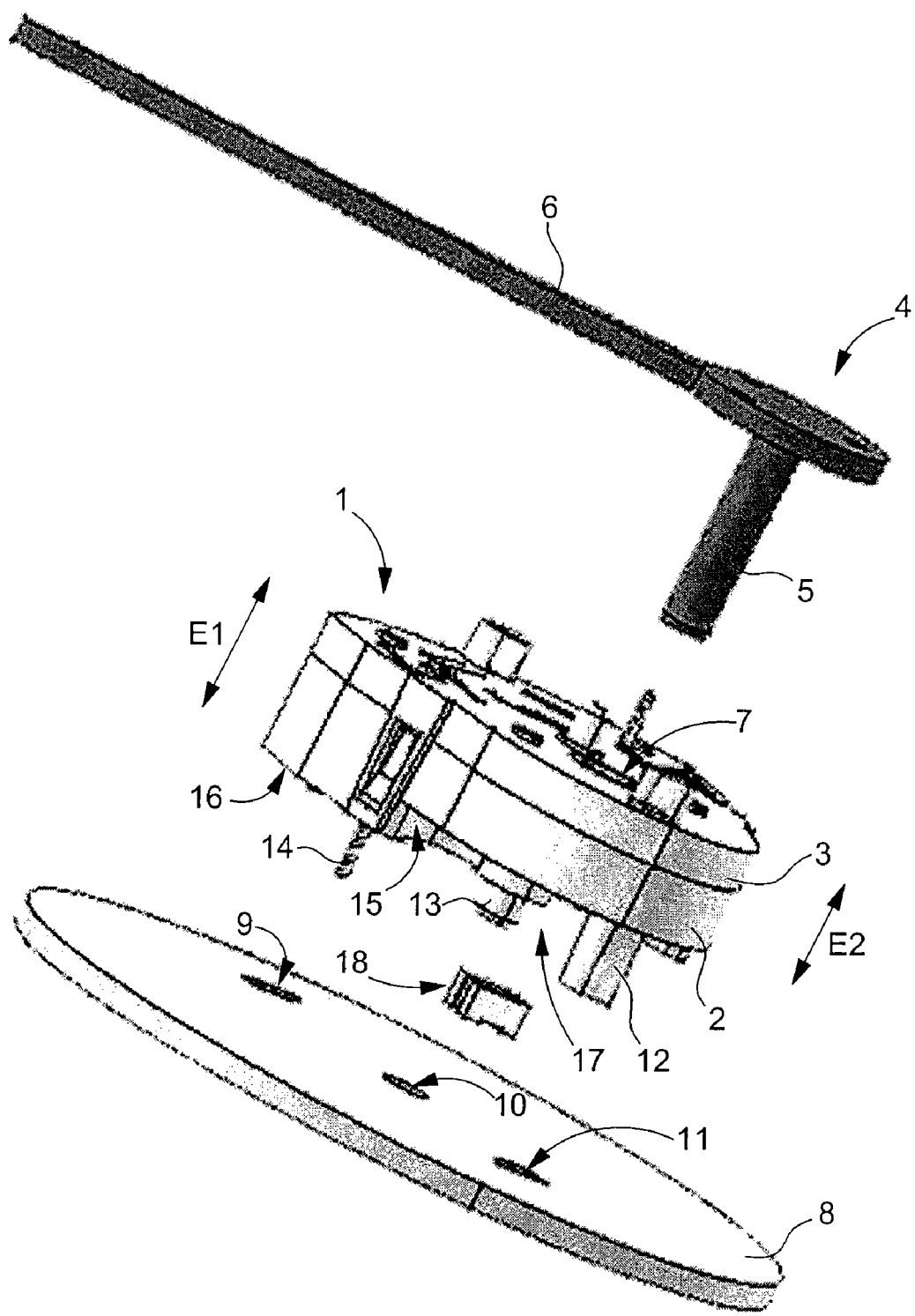
FIG. 1 shows a perspective view of one part of an indicator device according to a first embodiment of the present invention.

FIG. 1 shows an exploded perspective view of one part of the indicator hand device for an instrument panel, according to a first embodiment of the present invention.

The device shown in FIG. 1 includes a micromotor 1 comprising a case, composed in particular of a bottom 2 closed by a cover 3 and, inside which are housed various elements (shown in FIG. 2a) for driving an indicator hand 4. Hand 4 includes a stem 5, shown here in cylindrical shape by way of non-limiting illustration, secured to an index 6 whose function is to indicate the value of a measured physical variable opposite indications or scales carried by a dial (visible in FIG. 2a).

Figure 2A:
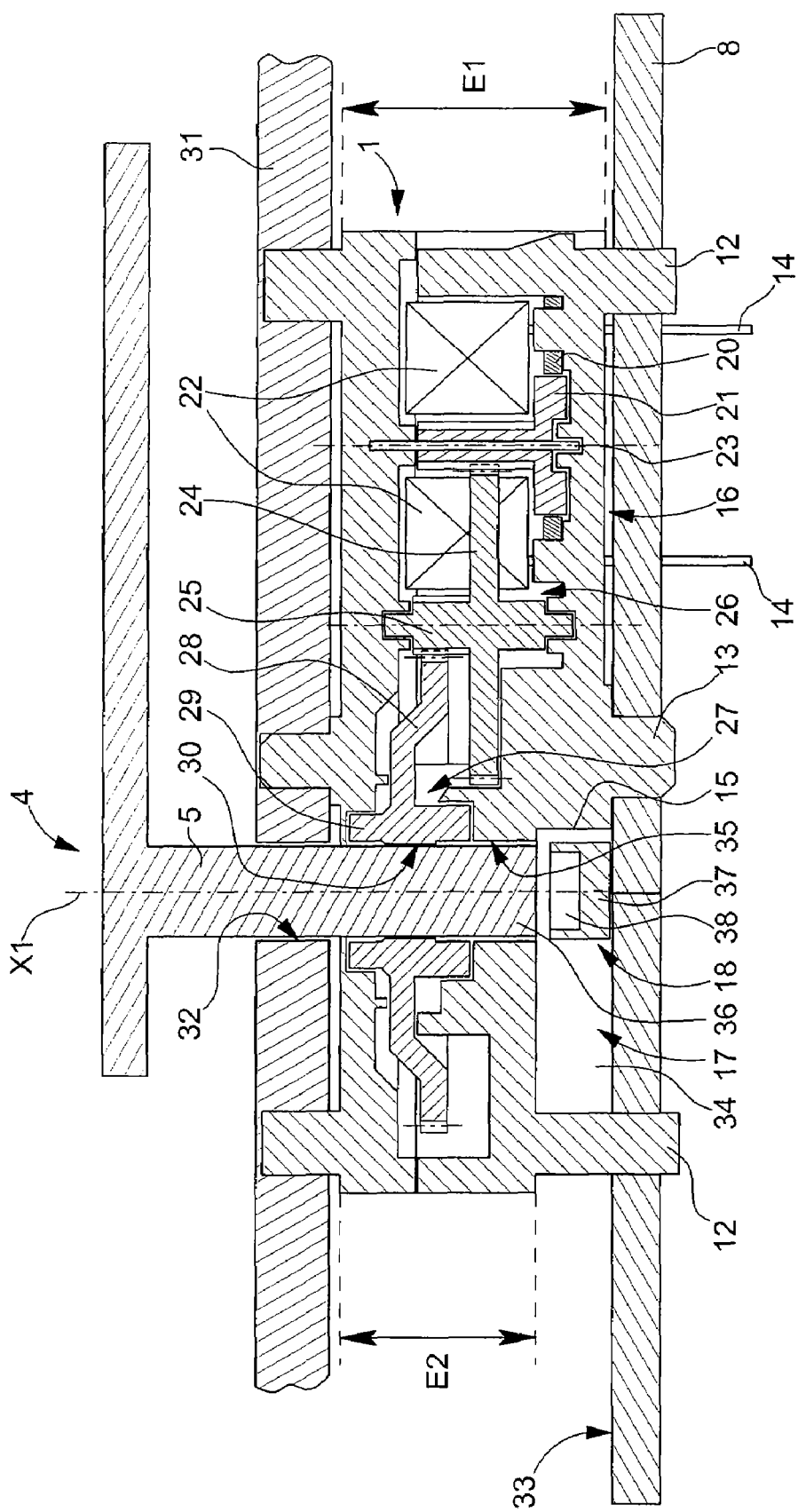
FIG. 2a shows a simplified cross-section of the indicator device shown in FIG. 1.
Figures 2B, 2C:
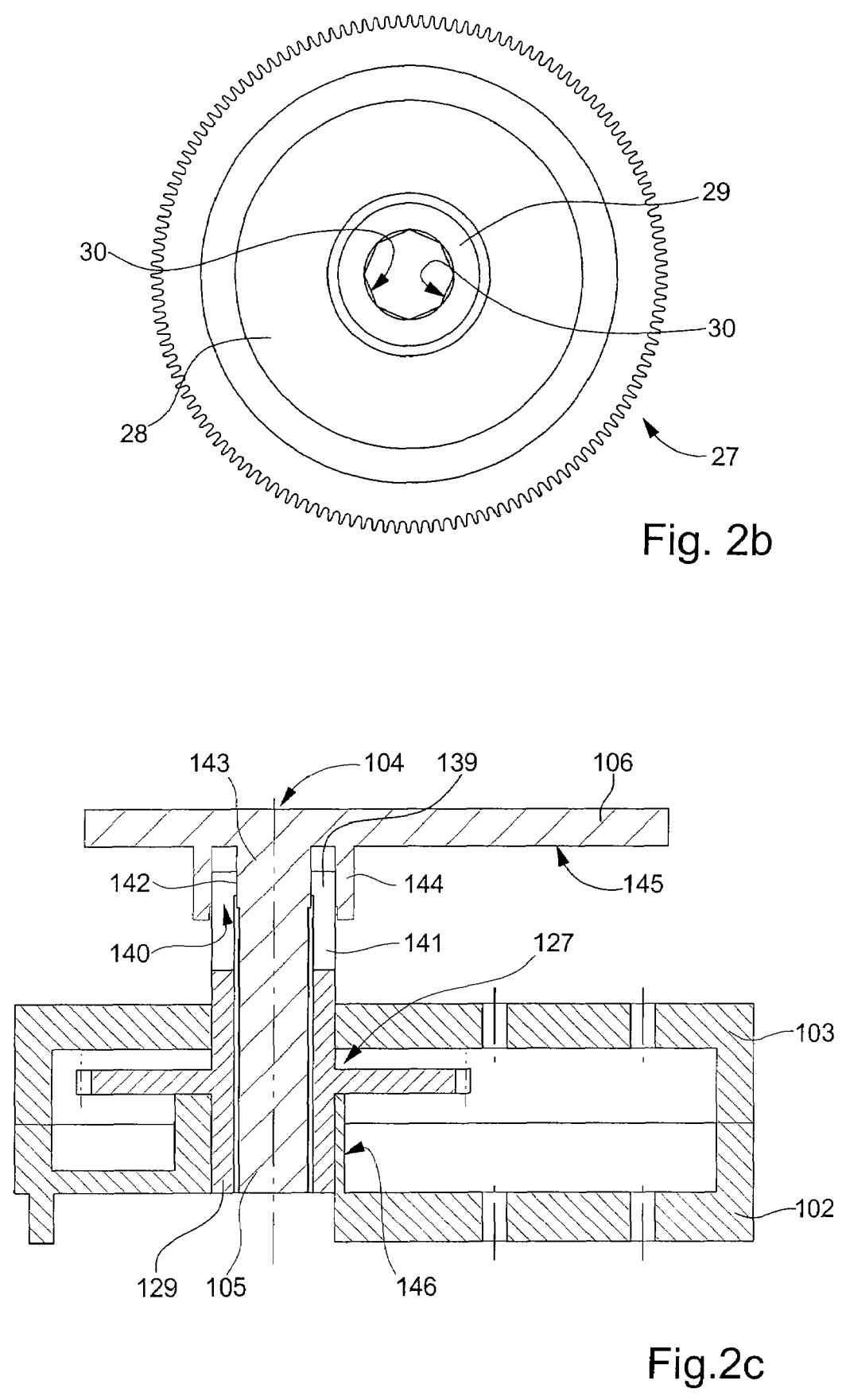

Cover 3 of the case includes in particular an aperture 7 through which the stem 6 of the hand is inserted to secure the latter to a drive wheel set of the micromotor (also visible in FIGS. 2a and 2b). It should be noted that insertion of the hand stem in the drive shaft is carried out after the dial is placed in the micromotor during the instrument panel assembly process.

Micromotor 1 is mounted on a printed circuit board (PCB) 8, shown in a diagram here in the form of a disc by way of non-limiting illustration. For this purpose, the PCB is provided with three apertures 9, 10 and 11 inside which feet 12 and 13 are inserted, three in number here, by way of example, only two being visible in the view of FIG. 1.

A contact 14 can also be seen in FIG. 1 for supplying electrical energy to the members of a motor, arranged inside the case. The contact is arranged so to be driven or welded in a hole of the PCB that is not illustrated, the hole being connected to printed circuit paths of the PCB (not shown) in a conventional manner.

Moreover, it will be noted in FIG. 1 that the bottom 2 of the case comprises a setback 15 defining a recess in the bottom of the case or even two areas of the case that have a different respective thickness. A first area 16 where the members of the motor are situated has a greater thickness E1 than the thickness E2 of a second area 17, where part of the drive wheel set is situated.

An additional component 18 has also been shown in diagrammatic form in FIG. 1 and it is to be arranged on the PCB facing the second area 17 of the case, i.e. in the recess. Generally speaking, this component 18 can be any component used in the instrument panel whose thickness is smaller than E1-E2. Alternatively, one could envisage arranging a plurality of components whose respective thickness is less than E-E2 on the PCB facing the second area 17 of the case, i.e. in the recess.

According to a preferred variant of the present embodiment in accordance with the invention, at least one of the components 18, if there are several, is a light source, preferably a light emitting diode. This diode is then plugged in to the PCB, either directly, or by means of a specific support, as shown in the Figures. Further, it should be noted that it is possible to use diodes with 1, 2 or 3 colours, of a conventional type, without departing from the scope of the present invention.

The particular structure of the micromotor according to the present invention and the arrangement of diode 18 appear more clearly in the cross-section shown in FIG. 2a.

Micromotor 1 includes a conventional type of motor comprising a stator 20 in which there is arranged an aperture adapted to house a rotor 21. Means for supplying energy to the motor are also arranged on stator 20 and are represented in FIG. 2a in the form of two coils 22, powered with current via their respective connection studs 14.

Rotor 21 is secured to a pivotably mounted shaft 23 in bottom 2 of the case on the one hand, and in cover 3 on the other hand. Shaft 23 further includes a toothing which meshes with the toothing of an intermediate wheel 24, the latter forming, in association with a shaft 25, an intermediate wheel set 26. Like shaft 23, shaft 25 is pivotably mounted, on the one hand in bottom 2 and, on the other hand, in cover 3 of the case.

A drive wheel set 27 is arranged in the micromotor case and comprises a toothed drive wheel 28, mounted on a hollow shaft 29 extending from the latter in the direction of the hand, wheel 28 meshing with shaft 25 of intermediate wheel set 26.

It should be noted that the micromotor shown here comprises a case preferably made by moulding plastic material. Thus, reliefs are provided for carrying drive wheel set 27, so as to position it properly while allowing it to rotate on itself with a minimum of friction.

Hollow shaft 29 comprises inner contact surfaces 30 providing the mechanical connection with stem 5 of indicator hand 4. The mechanical connection means used for the housing of indicator hand 4 inside hollow shaft 29 can be of a conventional type. However, a preferred embodiment of the coupling means between stem 5 of indicator hand 4 and drive wheel set 27 will be described in more detail hereinafter with reference to the description of FIGS. 2b and 2c.

Advantageously, drive wheel set 27 is preferably made in a single piece, by conventional plastic moulding.

FIG. 2a shows an example micromotor according to the present invention wherein a dial 31 has been set in place against cover 3 of the case. Dial 31 includes an aperture 32 allowing a passage for stem 5 of indicator hand 4.

Moreover, the micromotor is also shown as it is fixed to PCB 8 via its bottom 2, more specifically by feet 12 and 13 which cooperate with the adapted apertures 9, 10 and 11 of the PCB.

FIG. 2a shows more clearly the shape of setback 15 of bottom 2 of the cover. The setback has been shown, by way of non-limiting example, substantially perpendicular to the surface 33 of the PCB against which the micromotor is arranged.

Setback 15 forms a recess 34 in the bottom of the case which corresponds to two volume areas inside the micromotor case. A first volume area 16, shown on the right of FIG. 2a, corresponds to a thickness E1 of the case larger than thickness E2 of the case in the second area 17, shown on the left of FIG. 2a.

Indeed, it should be noted that the elements of an electric motor that typically occupy the most space are coils. Thus, the Applicant has observed that by using a compact motor structure, it is possible to limit the space requirement of a micromotor, in particular its thickness, in the part that includes elements other than the coils.

Consequently, in the micromotor according to the present invention, the constituent elements of the motor, i.e. stator 20, rotor 21 and coils 22 are arranged in a first volume area 16 of the case having a thickness E1. Thus, the case can have a reduced thickness E2 in volume area 17, which is used for housing the constituent elements of the micromotor that are smaller than the coils 22, particularly here the drive wheel set 17.

This distribution of the volume occupied by the constituent elements of the micromotor and the arrangement of recess 15 advantageously frees the recess 34 between one part of the micromotor, namely the part located in second volume area 17, and PCB 8.

The trend whereby more and more information is made available to the user of a vehicle on the instrument panel, has led to an increase in the electronic components necessary to mange the display on the instrument panel.

The existence of free space or recess 34 allows electronic components to be arranged therein that would otherwise have had to be arranged outside the projection of the micromotor case with known structures of the prior art. Recess 34 thus optimises the occupation of surface 33 of PCB 8. It should be noted that the substantial dimensions of recess 34 allow a large variety of conventional electronic components to be arranged therein.

A single component has been shown in FIG. 2a, by way of example and according to a preferred implementation of the indicator device according to the present invention.

In the implementation shown, by way of non-limiting illustration, a light source is arranged on PCB 8, in the second volume area 17. More specifically, bottom 2 of the case includes an aperture 35 in which the free end 36 of stem 5 of indicator hand 4 is positioned, when the latter is mounted in drive wheel set 27. The light source, represented here by a support 37 carrying a light emitting diode, or LED 38, is the positioned facing aperture 35, such that a maximum amount of light emitted by the LED 38 is directed directly inside the stem 5 of hand 4, in order to illuminate index 6 efficiently. Indicator hand 4 can then be manufactured in a single piece by a conventional moulding method.

In addition to illumination efficiency and the space saving, the micromotor structure according to the present invention has an additional advantage residing in the fact that the light source illuminating indicator hand 4 is arranged in an open environment. Thus, the heat dissipation generated by the LED is improved and the risk of a temperature rise in the elements located in proximity to the light source is reduced.

Of course additional elements can be arranged in proximity to the LED 38, in second volume area 17 provided that recess 34 offers sufficient space.

As mentioned previously, a preferred embodiment of the coupling means between stem 5 of the hand and drive wheel set 27 is shown in FIG. 2b, drive wheel set 27 being shown alone and seen from above. It can be seen in FIG. 2b that hollow shaft 29 has a section, in a mid plane parallel to the plane of the Figure, comprising a plurality of substantially rectilinear faces 30, eight in number for the embodiment shown here. Of course, the number of faces shown in FIG. 2b is not limiting and those skilled in the art will have no particular difficulty in determining the most suitable number of faces for a particular structure. In a preferred manner, the section of hollow shaft 29 can be of the polygonal type and comprise n faces, n being greater than or equal to 3. In particular, a shaft with 6 to 8 faces is preferred from the point of view of compromise between the efficiency of the mechanical connection with the stem and manufacturing complexity.

FIG. 2c shows, schematically and in cross-section, one part of the indicator hand device, according to an alternative embodiment of the coupling between the stem of the hand and the drive wheel set as described in relation to FIG. 2b.

Micromotor 100 is shown closed by its cover 103 in FIG. 2c. The end 139 of a hollow shaft 129 is shown opening outside cover 103 through an aperture fitted thereto and whose wall plays the part of a radial guide for the shaft.

It will be observed that shaft 129 comprises two longitudinal slots 140 which extend over practically all of the part of the shaft projecting outside the case. Slots 140 are substantially diametrically opposite so as to define two tongues 141 of semi-circular section capable of moving in relation to each other, in a resilient manner. It will also be observed that each of tongues 141 comprises a small shoulder 142 in proximity to the end 139 of the shaft. Thus, each of tongues 141 has a larger thickness in the part thereof that extends from shoulder 142 in the direction of the case.

Moreover, it is apparent from FIG. 2c that in addition to an index 106, from its base 143, and a stem 105, of substantially smaller diameter than that of base 143, hand 104 includes a ring 144. Ring 144 extends from the bottom surface 145 of index 106 of the hand while being coaxial to stem 105. Ring 144 has been shown here, in a non-limiting way, with a height slightly greater than the height of base 143 of the index. The inner diameter of the ring 144 is slightly greater than the external diameter of hollow shaft 129.

Thus, ring 144 will grip shaft 129 when hand 104 is mounted on the micromotor.

It will be noted that FIG. 2c has deliberately been simplified in order to clearly show the technical elements relating to the present invention.

Thus, the motor means for driving drive wheel set 127 have not been shown, nor have the transmission gear trains. FIG. 2c shows, schematically, the two-part case of micromotor 1, namely the bottom 102 and the cover 103, and a bearing 146 symbolised as being formed in one piece with bottom 102.

FIG. 2c allows the contact zones between hand stem 105 and hollow drive shaft 129 to be more clearly identified. Stem 105 is housed inside hollow shaft 129 such that its base 143 is located opposite small shoulders 142. Thus, each of tongues 141 exerts a pressure force on base 143 of hand stem 105, via its shoulder 142.

It will also be observed that ring 144 is arranged against tongues 141 when hand 104 is set in place inside hollow shaft 129. Thus, tongues 141 undergo a pressure force exerted by annular ring 144 which tends to push them back towards the inside of hollow shaft 129, i.e. against the base 143 of hand stem 105. The structure of ring 144 thus reinforces the friction arising from contact between the shoulders 142 and stem 105 so that drive wheel set 127 transmits its movement of rotation to hand 194 without sliding.

Further, it should be noted that the dimensions of stem 105, the interior of hollow shaft 129 and ring 144 are adjusted, to within manufacturing tolerances, such that, when stem 105 is housed inside shaft 129, each of the aforecited three elements undergoes a slight deformation in its resilient domain.

This particular feature allows hand 104 to be subsequently disassembled from shaft 129 without its stem 105 being damaged, while guaranteeing a mechanical connection quality that answers the requirements of the application for which the device is designed. To return to the aforecited application example in the field of instrument panels for motor vehicles, one of the requirements that an indicator device of this type must satisfy concerns the minimum torque that drive wheel set 127 must be able to transmit to hand 104, without any sliding between the hand stem and the shaft.

Thus, the Applicant was able to demonstrate, during numerous experiments, that it is possible to find a compromise between the transmitted torque and the number of times that the hand can withstand disassembly before being damaged. By way of example, the Applicant has observed that for the order of magnitude of the torque necessary in the automobile industry, namely around 5 mN.m, it is possible to adjust the respective dimensions of the shaft and the hand stem such that the latter can be disassembled up to five times without experiencing damage.

It should also be noted that the alternative embodiments described hereinbefore have two additional advantages from the point of view of the assembly of the hand on the micromotor. On the one hand, it is possible to carry out the assembly whatever the angular positions relating to the hand and the hollow shaft, provided that the two latter structural elements each have rotational symmetry with respect to axis X1. Moreover, the structure of the assembly means described allows the hand to be assembled on the hollow shaft not in a predefined relative axial position of such elements, but within a certain range. In other words, this feature allows adjustment of the axial position of the hand in relation to the micromotor to some extent to take account, for example, of the use of dials of different thickness with a single type of indicator device according to the present invention.

It should also be noted that the two variants that have just been described could advantageously be combined such that the hollow shaft includes a plurality of faces while the hand includes a ring at the base of its index.

Figure 3:
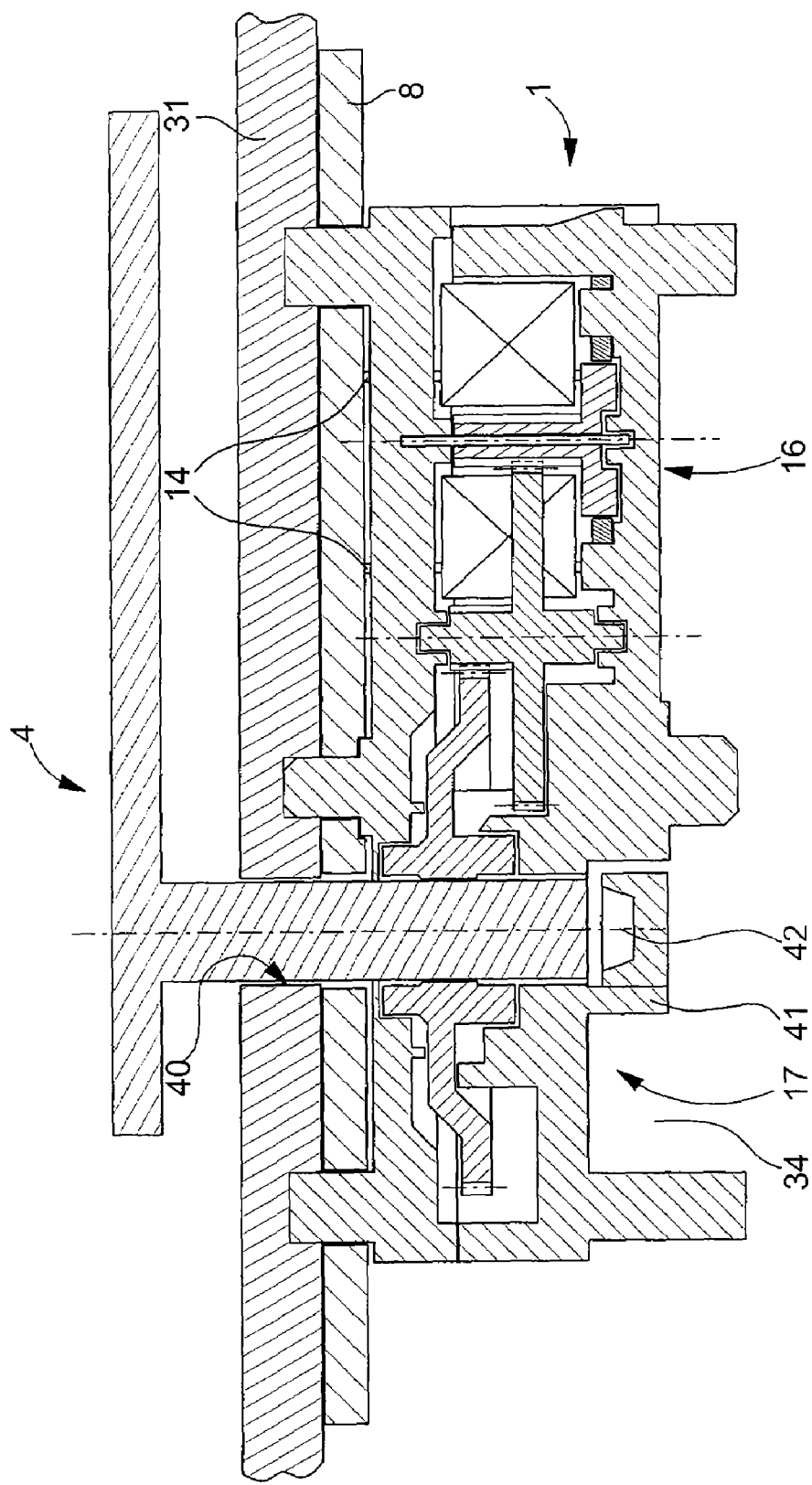
FIG. 3 shows a similar cross-section to that of FIG. 2a of one part of the indicator device according to a second embodiment of the present invention.

A second embodiment of the present invention has been shown in FIG. 3, by way of example. Micromotor arrangements are known wherein the micromotor is fixed to the PCB by its cover and not by its bottom, as shown in FIGS. 1 and 2a. The same reference numerals as those used in relation to the preceding Figures have been used to designate the same elements.

The arrangement inside the case of micromotor 1 is identical to that described previously. However, according to this embodiment, micromotor 1 is secured to PCB 8 by its cover 3. PCB 8 is also mounted on dial 31 and is further provided with an aperture 40 to leave a passage for indicator hand 4.

Insofar as, according to this embodiment, the light source cannot be fixed both to the PCB 8 and facing stem 5 of hand 4, an alteration must be provided to its support with respect to the description hereinbefore.

An extension 41 or support, is provided on the bottom of the case, substantially perpendicular to the bottom for example, to which a light source or LED 42 will be fixed, in order to position the latter opposite stem 5. In this case, a "side LED" is used, i.e. the direction of emission of the light is substantially perpendicular to the surface via which the LED is fixed to its support, and can be capable of emitting light of one, two or three different colours.

Owing to this structure, the LED can be mounted without inducing any increase in the space requirement of the micromotor from the point of view of thickness. Those skilled in the art will have no difficulty in using any conventional type of electrical connection from the LED to the PCB adapted to implementation of the present invention. One could for example envisage overmoulding electrical connectors (not shown) inside the micromotor case to provide the electric connection of the LED to the PCB, via extension 41 of the case.

Of course, those skilled in the art will be able to provide alternative solutions for securing the LED in the micromotor case, such as for securing it directly without any supports, without departing from the scope of the present invention.

The description hereinbefore corresponds to particular embodiments and should in no way be considered limiting, as regards more particularly the form described and shown of the various structural elements forming the motor and their respective positions.

Likewise, those skilled in the art will have no particular difficulty in adapting the shape of the recess to their particular needs without departing from the scope of the present invention. By way of example, it should be noted that the recess according to the present invention is not necessarily open on the lateral wall of the micromotor case, as it is shown in the Figures.

The possible applications of such a control device are extremely numerous since the present invention can be implemented for any type of electronic apparatus requiring a motor to drive a moving element, such as an analogue indicator member, and having to respect constraints as regards space requirement.

The invention claimed is:

1. A micromotor for indicator hand device including:
a case inside which are housed motor means and means provided for transmitting the movement from said motor means to a drive shaft with an axis X1 capable of driving an indicator hand,
said case including a first face including an aperture making said drive shaft accessible and a second face opposite said first face,
the distance separating said first face from said second face defining a maximum thickness E1 of said case,
said first and second faces being connected to each other by at least one lateral face,
wherein said case has an area of thickness E2 that is smaller than said maximum thickness E1 so as to define an open recess in said second face,
said recess also being open on said lateral face.

2. The micromotor according to claim 1, wherein said recess is arranged in an area of said second face at least partly located opposite said drive shaft.

3. The micromotor according to claim 1, wherein said drive shaft is hollow, said second face of the case including an aperture arranged substantially opposite said axis X1 of the hollow shaft.

4. The micromotor according to claim 3, wherein the micromotor further includes a support arranged in the area of said aperture for receiving a light source, the total thickness of the case and said light source support being less than or equal to the maximum thickness E1 of the case.

5. The micromotor according to claim 4, wherein said case includes a bottom defining said second face and closed by a cover, said cover defining said first face, the bottom having at least one setback forming said recess.

6. The micromotor according to claim 3, further including mechanical means allowing said hand to be disassembled a plurality of times from the shaft without either of the latter elements undergoing damage rendering said elements unfit for use.

7. The micromotor according to claim 6, said mechanical means being arranged in particular in said hollow shaft which has a section, in a substantially perpendicular plane to said axis X1, in the form of an n-sided polygon, n being greater than or equal to 3, a stem of the hand being cylindrical.

8. The micromotor according to claim 6, said mechanical means including in particular a ring secured to an index of said hand, said ring being arranged concentrically around the base of said index of the hand and having a substantially greater diameter than the external diameter of said shaft.

9. The micromotor according to claim 1, wherein some areas of said case have a thickness substantially equal to said maximum thickness E1 correspond to a first volume area of the interior of the case in which said motor means are arranged, whereas an area of the case located substantially opposite said recess corresponds to a second volume area of the interior of the case in which said drive shaft is arranged.

10. The micromotor according to claim 1, wherein said second face of the case includes at least one foot for positioning and/or securing the case on a support.

11. An indicator device for an instrument panel including a micromotor according to claim 1 mounted on a printed circuit board.

12. The indicator device according to claim 11, when said micromotor is mounted on said printed circuit board by the second face thereof, wherein at least one component is arranged on said printed circuit board while being at least partially arranged in said recess.

13. The indicator device according to claim 12, when said drive shaft is hollow, wherein said component includes a light source, the indicator device further including an indicator hand including a transparent stem, the later being housed in said drive shaft.

* * * * *